United States Patent
Yousefpor

(10) Patent No.: US 8,810,542 B2
(45) Date of Patent: Aug. 19, 2014

(54) CORRECTION OF PARASITIC CAPACITANCE EFFECT IN TOUCH SENSOR PANELS

(75) Inventor: Marduke Yousefpor, San Jose, CA (US)

(73) Assignee: Apple Inc., Cupertino, CA (US)

( * ) Notice: Subject to any disclaimer, the term of this patent is extended or adjusted under 35 U.S.C. 154(b) by 955 days.

(21) Appl. No.: 12/208,324

(22) Filed: Sep. 10, 2008

(65) Prior Publication Data

US 2010/0060608 A1     Mar. 11, 2010

(51) Int. Cl.
*G06F 3/044* (2006.01)
*G06F 3/041* (2006.01)

(52) U.S. Cl.
CPC .............. G06F 3/0418 (2013.01); G06F 3/044 (2013.01)
USPC ........................................................ 345/174

(58) Field of Classification Search
USPC ........................................................ 345/174
See application file for complete search history.

(56) References Cited

U.S. PATENT DOCUMENTS

| | | | |
|---|---|---|---|
| 5,283,559 A | 2/1994 | Kalendra et al. | |
| 5,483,261 A | 1/1996 | Yasutake | |
| 5,488,204 A | 1/1996 | Mead et al. | |
| 5,543,588 A | 8/1996 | Bisset et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,466,036 B1 * | 10/2002 | Philipp | 324/678 |
| 6,469,524 B1 * | 10/2002 | Oberdier | 324/688 |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,466,148 B2 * | 12/2008 | Fridman et al. | 324/686 |
| 7,663,607 B2 | 2/2010 | Hotelling et al. | |
| 8,479,122 B2 | 7/2013 | Hotelling et al. | |

(Continued)

FOREIGN PATENT DOCUMENTS

| | | |
|---|---|---|
| JP | 08-044493 A | 2/1996 |
| JP | 11-143626 A | 5/1999 |

(Continued)

OTHER PUBLICATIONS

International Search Report mailed Feb. 18, 2010, for PCT Application PCT/US09/56414. filed Sep. 9, 2009, three pages.

(Continued)

*Primary Examiner* — William Boddie
*Assistant Examiner* — Andrew Schnirel
(74) *Attorney, Agent, or Firm* — Morrison & Foerster LLP

(57) ABSTRACT

Compensation of pixels included in a touch sensor panel that generate erroneous readings (so called "negative pixels") due to a poor grounding condition of the object touching the touch sensor panel is disclosed herein. To compensate for the erroneous readings, sense lines of the touch sensor panel can include reverse driving circuits to facilitate calculation of an object-to-ground capacitance. If the calculated object-to-ground capacitance indicates the presence of a poor grounding condition, then the object-to-ground capacitance and detected pixel touch output values are used to estimate new pixel touch output values that are used instead of the detected pixel touch output values to determine touch event(s).

30 Claims, 12 Drawing Sheets

(56) References Cited

U.S. PATENT DOCUMENTS

| | | | |
|---|---|---|---|
| 2005/0110768 | A1 | 5/2005 | Marriott et al. |
| 2005/0179671 | A1 | 8/2005 | DeGroot et al. |
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2006/0232567 | A1 | 10/2006 | Westerman et al. |
| 2007/0074913 | A1* | 4/2007 | Geaghan et al. ............ 178/18.06 |
| 2007/0152984 | A1 | 7/2007 | Ording et al. |
| 2007/0257890 | A1 | 11/2007 | Hotelling et al. |
| 2008/0007529 | A1* | 1/2008 | Paun et al. .................... 345/168 |
| 2008/0158175 | A1* | 7/2008 | Hotelling et al. ............. 345/173 |
| 2008/0252474 | A1* | 10/2008 | Nakamura et al. ............ 340/657 |
| 2009/0032312 | A1* | 2/2009 | Huang et al. ................ 178/18.06 |
| 2009/0160787 | A1* | 6/2009 | Westerman et al. .......... 345/173 |

FOREIGN PATENT DOCUMENTS

| | | |
|---|---|---|
| JP | 2000-163031 A | 6/2000 |
| JP | 2002-342033 A | 11/2002 |
| WO | WO-2010/030710 A1 | 3/2010 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Boie, R. A., Capacitive Impedance Readout Tactile Image Sensor, IEEE, 1994, pp. 370-378.

U.S. Appl. No. 11/963,578: Westerman, Wayne, et al., Negative Pixel Compensation, filed Dec. 21, 2007.

* cited by examiner

CORRECTION OF PARASITIC CAPACITANCE EFFECT IN TOUCH SENSOR PANELS

FIELD OF THE INVENTION

This relates generally to multi-touch sensor panels that utilize an array of capacitive sensors (pixels) to detect and localize touch events, and more particularly, to the correction of pixels having distorted readings when touch events are generated by a poorly grounded object.

BACKGROUND OF THE INVENTION

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can, in some embodiments, be formed from a matrix of drive lines (e.g., row traces) separated by a dielectric material from a plurality of sense lines (e.g., column traces), with sensors or pixels created at each crossing point of the drive and sense lines. Touch sensor panels can alternatively be arranged in any number of orientations or dimensions, including, but not limited to, diagonal, concentric circles, spiral, three-dimensional, or random orientations. In order to detect and identify the location of a touch on a touch sensor panel, stimulation signals are provided to the drive lines causing the sense lines to generate signals indicative of touch output values. By knowing the timing of the stimulation signals to specific drive lines relative to the signals read out of the sense lines, processor(s) can be used to determine where on the touch sensor panel a touch occurred.

When the object touching the touch sensor panel is poorly grounded, touch output values read out of the sense lines may be erroneous, false, or otherwise distorted. The possibility of such erroneous, false, or otherwise distorted signals is further increased when two or more simultaneous touch events occur on the touch sensor panel.

SUMMARY OF THE INVENTION

Present application relates to compensation of pixels that generate false, erroneous, or otherwise distorted touch output readings (so-called "negative pixels") due to poor grounding of the object touching the touch sensor panel.

Erroneous detection of what appears to be negative touch event(s) may occur when a user is touching one or more locations on the touch sensor panel but fails to also be in good contact with another part of the device including the touch sensor panel. To compensate for these erroneous readings, sense lines of the touch sensor panel can include reverse driving circuits to facilitate calculation of an object-to-ground capacitance. This capacitance is periodically calculated during normal operation of the touch sensor panel to identify when the touch sensor panel is being touched under poor grounding conditions. If the calculated object-to-ground capacitance indicates the presence of a poor grounding condition, then the object-to-ground capacitance and detected pixel touch output values are used to estimate new pixel touch output values in an iterative manner. These new values represent estimates of the actual pixel touch output values and are used in place of the detected pixel touch output values to actually determine touch event(s). Accordingly, improved accuracy is provided for determining touch event(s) on a touch sensor panel.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the invention relate to correction of erroneous detection of touch event(s) on a touch sensor panel. Erroneous detection of what appears to be negative touch event(s) (e.g., so-called "negative pixels") may occur when a user is touching one or more locations on the touch sensor panel but fails to also be in good contact with another part of the device including the touch sensor panel. To compensate for these erroneous readings, sense lines of the touch sensor panel can include reverse driving circuits to facilitate calculation of an object-to-ground capacitance. This capacitance is periodically calculated during normal operation of the touch sensor panel to identify when the touch sensor panel is being touched under poor grounding conditions. If the calculated object-to-ground capacitance indicates the presence of a poor grounding condition, then the object-to-ground capacitance and detected pixel touch output values are used to estimate new pixel touch output values in an iterative manner. These new values represent estimates of the actual pixel touch output values and are used in place of the detected pixel touch output values to actually determine touch event(s). Accordingly, improved accuracy is provided for determining touch event(s) on a touch sensor panel.

Although embodiments of the invention may be described and illustrated herein in terms of mutual capacitance touch sensor panels, it should be understood that embodiments of this invention are not so limited, but are additionally applicable to self-capacitance sensor panels, and both single and multi-touch sensor panels in which detection errors occur due to poor grounding conditions. The touch sensor panel may be implemented with a display, trackpad, trackball, or a variety of other touch sensing surfaces where determination of location and/or intensity of touch would be relevant.

Figure 1:
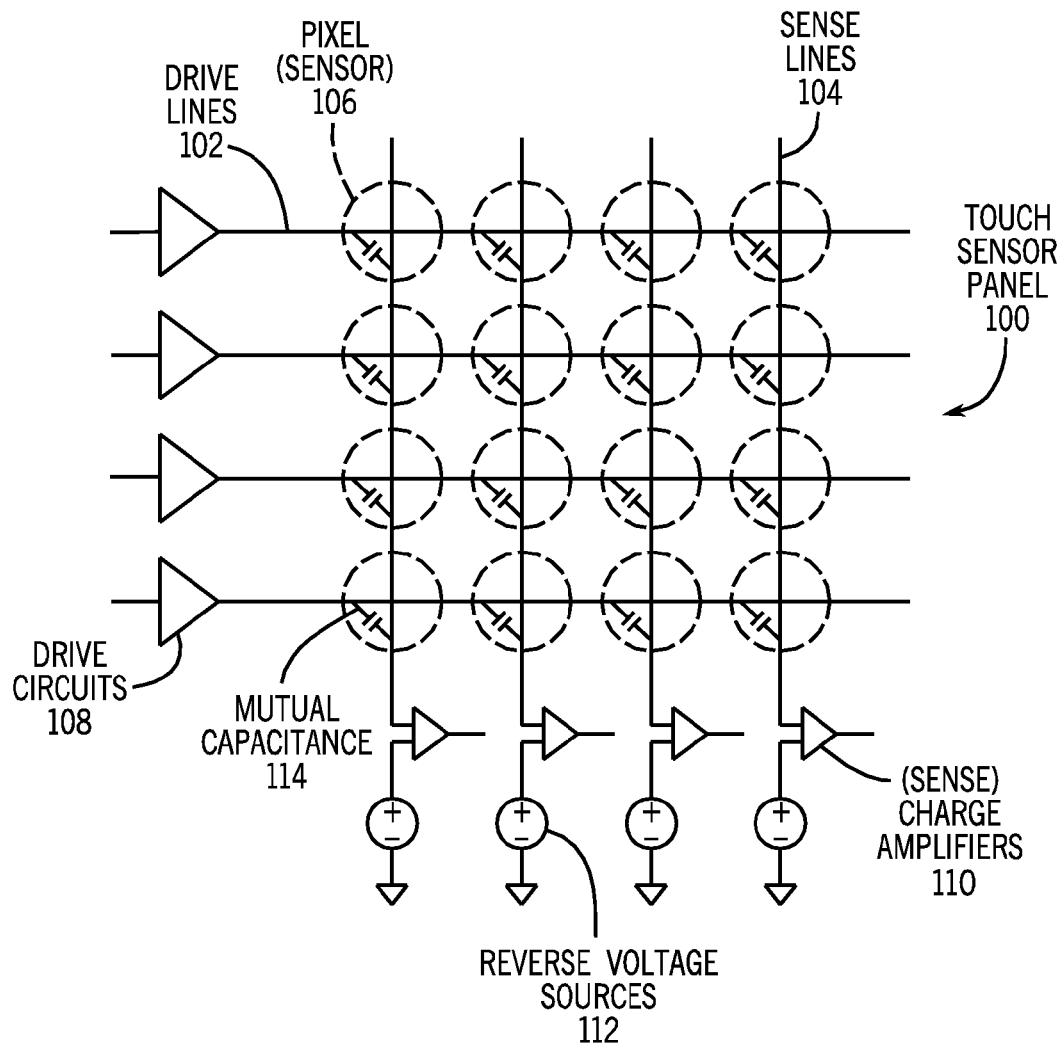
FIG. 1 illustrates an exemplary touch sensor panel in accordance with embodiments of the invention.

FIG. 1 illustrates an exemplary touch sensor panel 100 according to embodiments of the invention. Touch sensor panel 100 includes an array of pixels 106 that can be formed by a two-layer electrode structure separated by a dielectric material. One layer of electrodes comprises a plurality of drive lines 102 positioned perpendicular to another layer of electrodes comprising a plurality of sense lines 104. The pixels 106 (also referred to as sensors) can be formed at the crossing points of the drive lines 102 and sense lines 104, with each of the pixels 106 having an associated mutual capacitance 114 (also referred to as coupling capacitance).

Drive lines 102 (also referred to as rows, row traces, or row electrodes) can be activated by stimulation signals provided by respective drive circuits 108. Each of the drive circuits 108 includes an alternating current (AC) voltage source referred to as a stimulation signal source. The stimulation signals from the drive circuits 108 may also be referred to as forward driving signals or forward stimulation signals. Sense lines 104 (also referred to as columns, column traces, or column electrodes) can be activated by stimulation signals provided by respective reverse voltage sources 112 coupled to an input of its respective sense amplifier 110. Such stimulation signals may also be referred to as reverse driving signals or reverse stimulation signals. The reverse voltage sources comprise AC voltage sources. The sense amplifiers 110 may also be referred to as charge amplifiers or trans-conductance amplifiers.

To sense touch event(s) on the touch sensor panel 100, each of the drive lines 102 can be sequentially stimulated by the drive circuits 108, and the sense amplifiers 110 detect the resulting voltage values from the sense lines 104. The detected voltage values are representative of pixel touch output values, indicating the pixel location(s) where the touch event(s) occurred and the amount of touch that occurred at those location(s).

Figure 2:
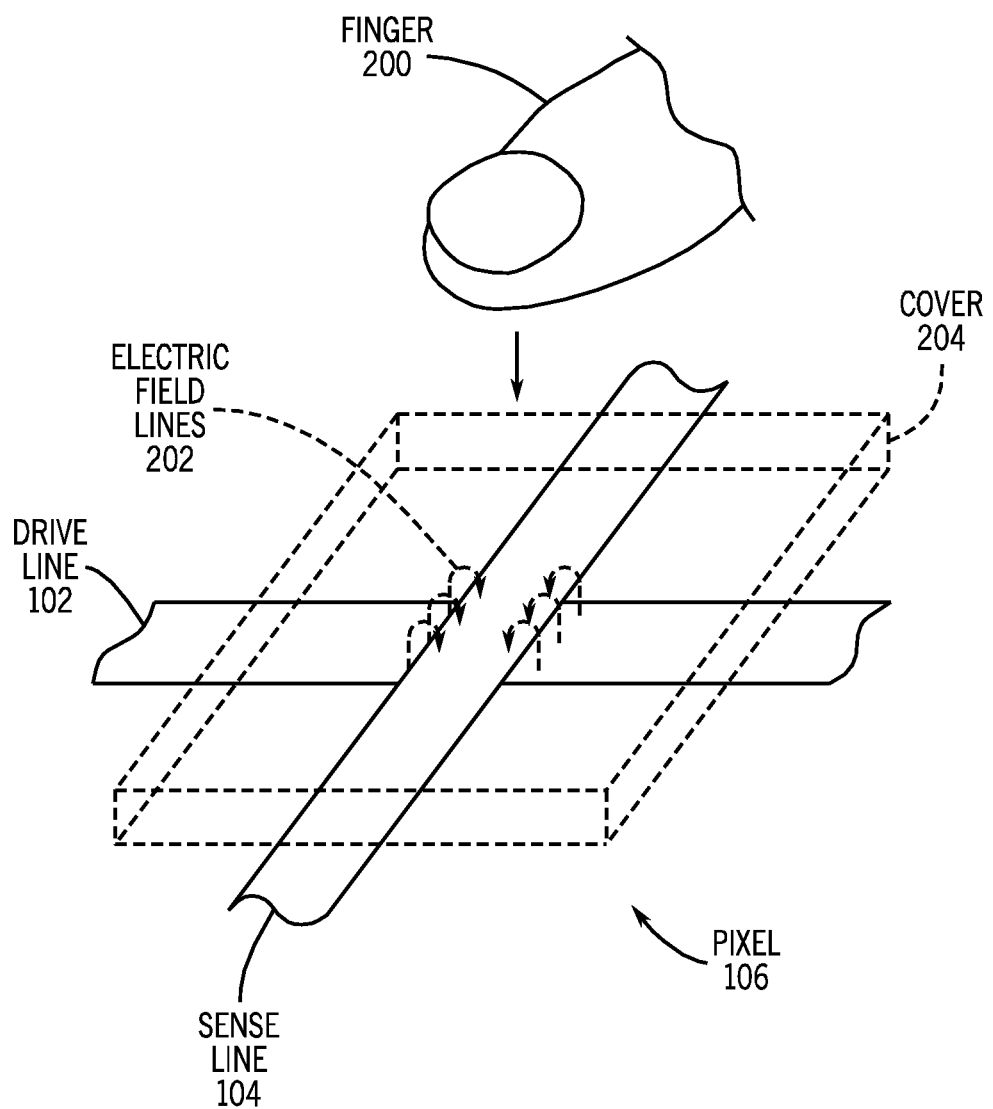
FIG. 2 illustrates a close-up of a single exemplary pixel of the touch sensor panel with an impending touch event by a finger in accordance with embodiments of the invention.

FIG. 2 illustrates a close-up of a single exemplary pixel 106 with an impending touch event by a finger 200. When the pixel 106 is not touched by an object, an electric field (shown as fringing electric field lines 202) can be formed between the drive line 102 and the sense line 104 via a dielectric material. Some of the electric field lines 202 can extend above the drive and sense lines 102, 104 and even above a cover 204 located over the touch sensor panel 100. When an object, such as the finger 200, touches the pixel 106 (or a location near the pixel 106), the object blocks some of the electric field lines 202 extending above the cover 204. Such blockage or interruption of the electronic field lines 202 changes the capacitance associated with the pixel 106, which changes the current flow from the drive line 102 to the sense line 104 (current is proportional to capacitance), and which in turn changes the voltage value (or charge coupling) detected at the sense line 104.

Figure 3:
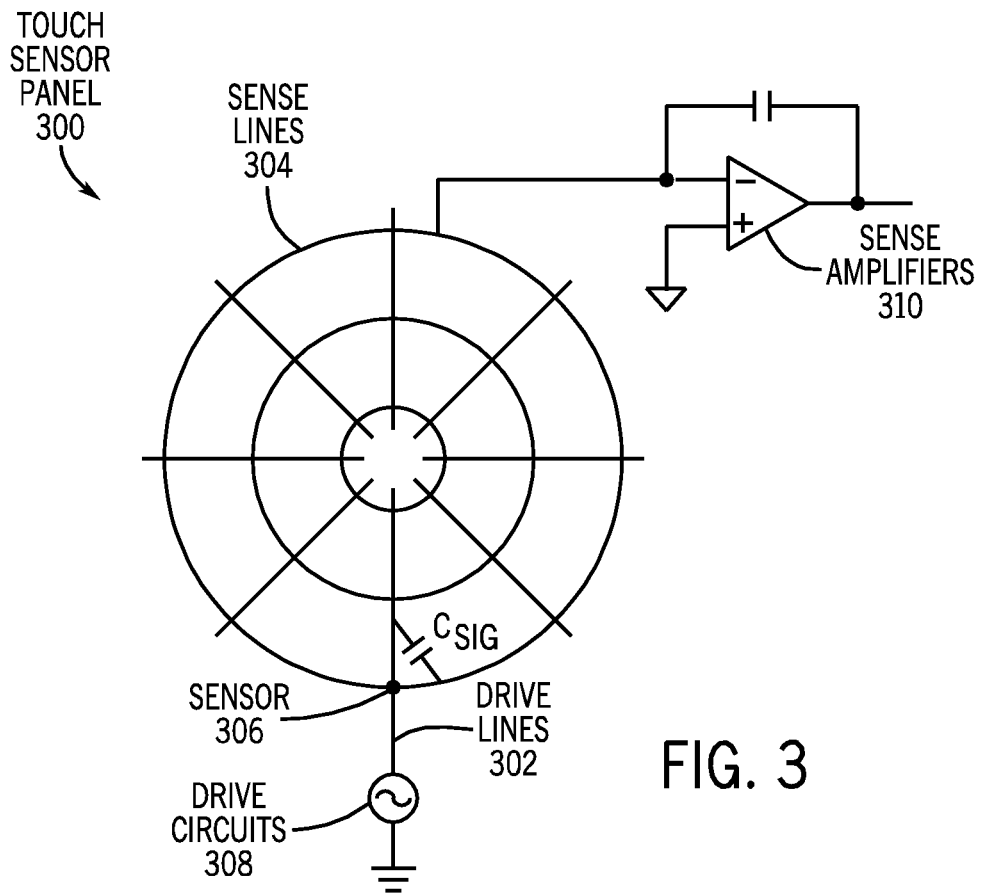
FIG. 3 illustrates an alternative embodiment of the touch sensor panel in accordance with embodiments of the invention.

The touch sensor panel 100 illustrated in FIG. 1 is arranged according to a Cartesian coordinate system. In alternate embodiments, the touch sensor panel 100 may be arranged in any number of orientations or dimensions, including, but not limited to, diagonal, concentric circles, spiral, three-dimensional, or random orientations. For example, FIG. 3 illustrates a touch sensor panel 300 arranged according to a polar coordinate system. The touch sensor panel 300 comprises a plurality of radially extending drive lines 302 and a plurality of concentrically arranged sense lines 304. At the crossing points of the drive lines 302 and sense lines 304 can be formed pixels 306 having an associated mutual capacitance $C_{SIG}$. The drive lines 302 are driven by driving circuits 308. The sense lines 304 are detected by sense amplifiers 310.

When a touch event occurs on the touch sensor panel 100, capacitive coupling other than that described above may occur. These other capacitive couplings can be of a magnitude significant enough to be undesirable and can lead to erroneous, false, or otherwise distorted pixel touch output values. Parasitic capacitance can be introduced when the object touching the touch sensor panel 100 is poorly grounded. For purposes of this application, "poorly grounded" may be used interchangeably with "ungrounded," "not grounded," "not well grounded," "isolated," or "floating" and includes poor grounding conditions that exist when the object is not making a low resistance electrical connection to the ground of the device employing the touch sensor panel. As an example, if the device employing the touch sensor panel 100 is placed on a table and the object only touches the device on the touch sensor panel 100, then a poor grounding condition may exist for that touch event. Conversely, if the object touches the touch sensor panel 100 and another part of the device (e.g., the object is holding the device and is in contact with the back of the device), then a good grounding condition exists and the impact of parasitic capacitance is negligible.

The presence of parasitic capacitance under poor grounding conditions can distort pixel touch output values in at least two ways. First, the change in the pixel touch output value measured for the touched pixel 106 can be less than it actually should be. Thus, the device employing the touch sensor panel 100 erroneously believes a lesser degree of touch occurred at the pixel 106 than in actuality. Second, when more than one simultaneous touch event is caused by the same poorly grounded object, pixel(s) 106 that were not actually touched may register having received a negative amount of touch (a "negative pixel" at a phantom location). Sensing negative pixels at phantom locations may be problematic when the touch sensor panel 100 is operable to capture inputs, for example, for a graphical user interface (GUI). Negative pixels are described in U.S. patent application Ser. No. 11/963,578 filed on Dec. 21, 2007 and entitled "Negative Pixel Compensation," the contents of which are incorporated by reference herein in its entirety.

FIGS. 4A-4D illustrate exemplary conceptually equivalent electrical circuits corresponding to a single pixel 106 under different touch and grounding conditions. In FIGS. 4A-4D, the reverse voltage source 112 included on the sense line 104 is not shown, as the voltage value would be zero during touch sensing operations.

Figure 4A:
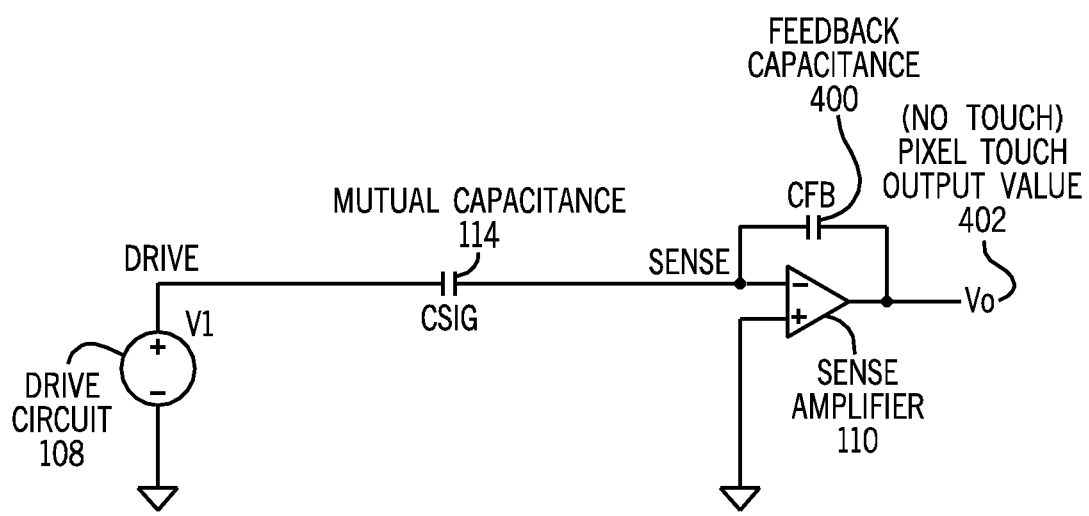
FIGS. 4A-4D illustrate exemplary conceptually equivalent electrical circuits corresponding to a single pixel of the touch sensor panel under different touch and grounding conditions in accordance with embodiments of the invention.

The circuit illustrated in FIG. 4A is representative of a no touch scenario. The drive circuit 108 applies a stimulation signal $V_1$ to the drive line 102. The stimulation signal can comprise an AC voltage signal having a variety of amplitude, frequency, and/or waveform shape. For example, the stimulation signal may comprise a sinusoidal 18 Vpp signal. With no object interrupting the electric field lines, the characteristic mutual capacitance 114 comprises the charge coupling detected at the sense amplifier 110. In FIG. 4A, the mutual capacitance 114 is denoted as $C_{SIG}$ and a feedback capacitance 400 is denoted as $C_{FB}$. The resulting (no touch) pixel touch output value 402 ($V_o$) at the output of the sense amplifier 110 can be expressed as:

$$V_o = V_1 \times C_{SIG}/C_{FB} \quad (1)$$

Figure 4B:
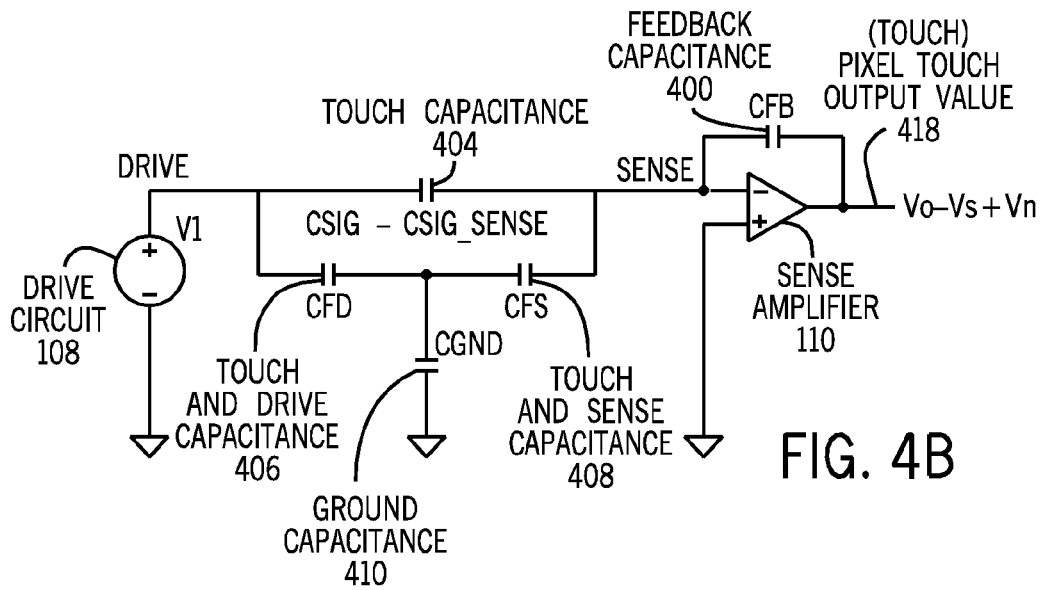

The circuit illustrated in FIG. 4B is representative of an object, such as the finger 200, touching the pixel 106 (or near the pixel 106). When a stimulation signal $V_1$ is applied to the drive line 102, similar to that discussed above for FIG. 4A, and with the object blocking some of the electric field lines between the drive line 102 and sense line 104, the characteristic mutual capacitance 114 is reduced and becomes a touch capacitance 404. The capacitance is reduced by $C_{SIG\_SENSE}$ and the touch capacitance 404 can be denoted as $C_{SIG}-C_{SIG\_SENSE}$. As an example, the mutual capacitance 114 (e.g., with no touch) may be approximately 0.75 picoFarad (pF) and the touch capacitance 404 (e.g., with touch) may be approximately 0.25 pF.

Figure 4C:
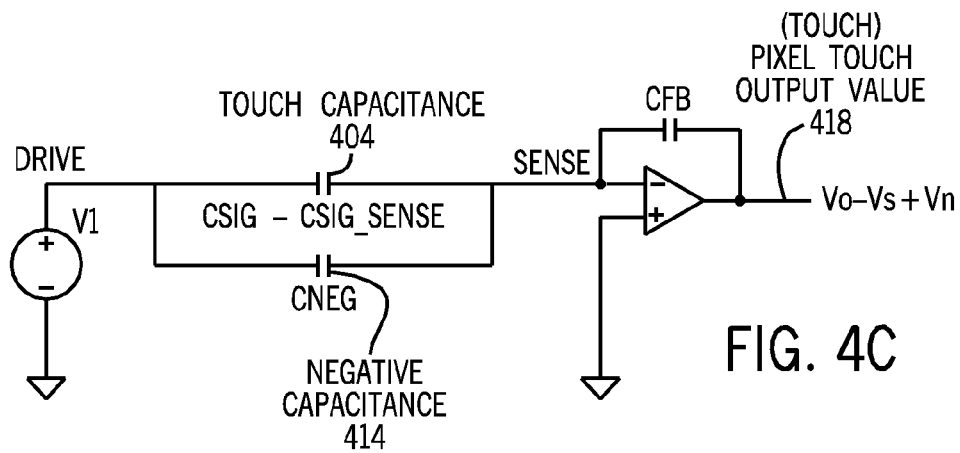

Introduction of touch not only changes the charge coupling at the pixel 106 from the mutual capacitance 114 to the touch capacitance 404, but undesirable capacitance couplings called parasitic capacitance can also be introduced. Parasitic capacitance comprises a touch and drive capacitance 406 ($C_{FD}$) in series with a touch and sense capacitance 408 ($C_{FS}$). Also shown in FIG. 4B is a ground capacitance 410 ($C_{GND}$) (also referred to as an object-to-ground capacitance) comprising inherent capacitance associated with the device and an inherent capacitance associated with the object. The circuit illustrated in FIG. 4C is equivalent to the circuit shown in FIG. 4B. In FIG. 4C, a negative capacitance 414 ($C_{NEG}$) is equivalent to the combination of the touch and drive capacitance 406, touch and sense capacitance 408, and ground capacitance 410 in FIG. 4B. The negative capacitance 414 can be expressed as:

$$C_{NEG} = C_{FD} \times C_{FS}/(C_{FD}+C_{FS}+C_{GND}) \quad (2)$$

Figure 4D:
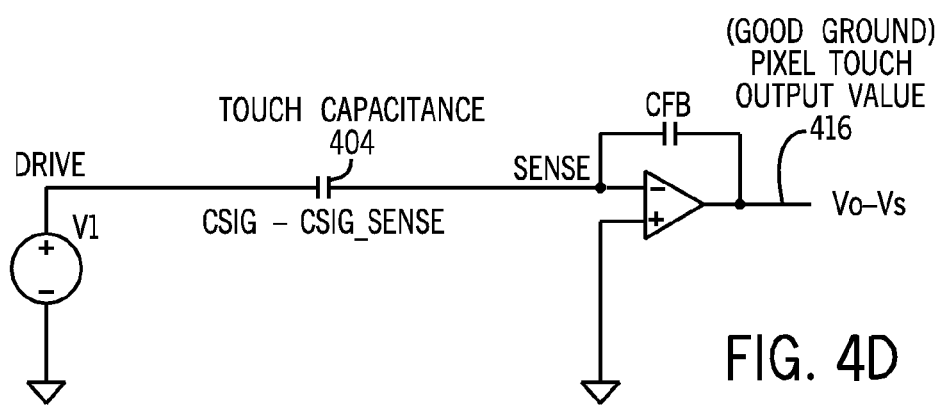

When the object touching the pixel 106 is well grounded because, for example, the object is also touching a bezel, backside, or other part of the device employing the touch sensor panel 100, the ground capacitance 410 is a large value relative to the touch and drive capacitance 406 and the touch and sense capacitance 408. (Ground capacitance 410 ($C_{GND}$) under good grounding conditions can be on the order of 100 pF.) The large value of the ground capacitance 410 results in the negative capacitance 414 being a negligible value (notice $C_{GND}$ in the denominator in Equation (2)). The touch and drive capacitance 406 has the effect of increasing the drive current of the drive circuit 108, while the touch and sense capacitance 408 has the effect of being shunted by the virtual ground of the sense amplifier 110. Thus, a circuit illustrated in FIG. 4D is representative of the object touching the pixel 106 under good grounding conditions. The resulting (good ground) pixel touch output value 416 (denoted as $V_o-V_s$) at the output of the sense amplifier 110 is proportionally smaller relative to the (no touch) pixel touch output value 402 and can be expressed as:

$$V_o-V_s = (V_1 \times C_{SIG}/C_{FB}) - (V_1 \times C_{SIG\_SENSE}/C_{FB}) \quad (3)$$

In contrast, when the object touching the pixel 106 is under poor grounding conditions, the negative capacitance 414 is no longer negligible. The touch and sense capacitance 408 is no longer shunted to ground. The ground capacitance 410 can be on the same order as the touch and drive capacitance 406 and touch and sense capacitance 408. (Ground capacitance 410 ($C_{GND}$) under poor grounding conditions can be on the order of 1 pF.) The negative capacitance 414 causes the voltage detected at the sense amplifier 110 to be higher by an amount $V_a$ than under good grounding conditions:

$$V_n = V_1 \times C_{NEG}/C_{FB} \quad (4)$$

The (poor ground) pixel touch output value 418 can be expressed as $V_o-V_s+V_n$. The parasitic effect on the actual pixel touch output value is in the opposite direction of the intended touch capacitance change. Hence, a pixel experiencing touch under poor grounding conditions may detect less of a touch than is actually present.

Figure 5A:
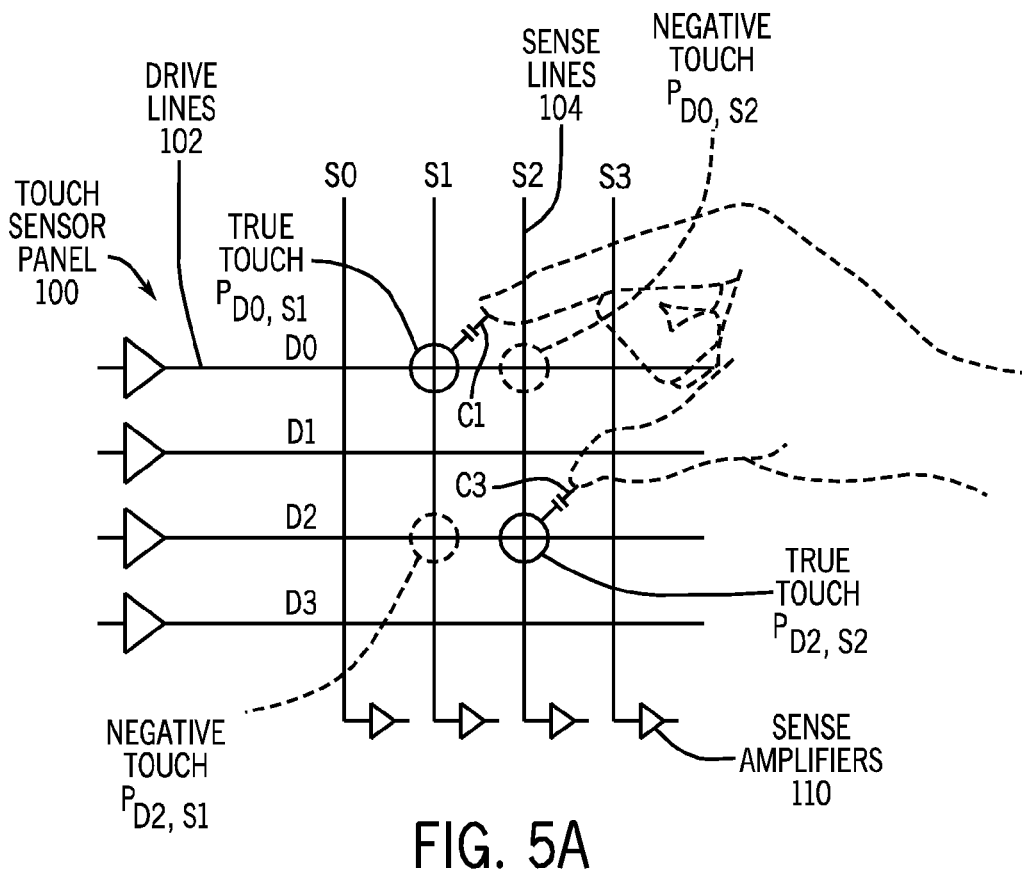
FIG. 5A illustrates a simultaneous multiple touch event occurring on the touch sensor panel in accordance with embodiments of the invention.
Figure 5B:
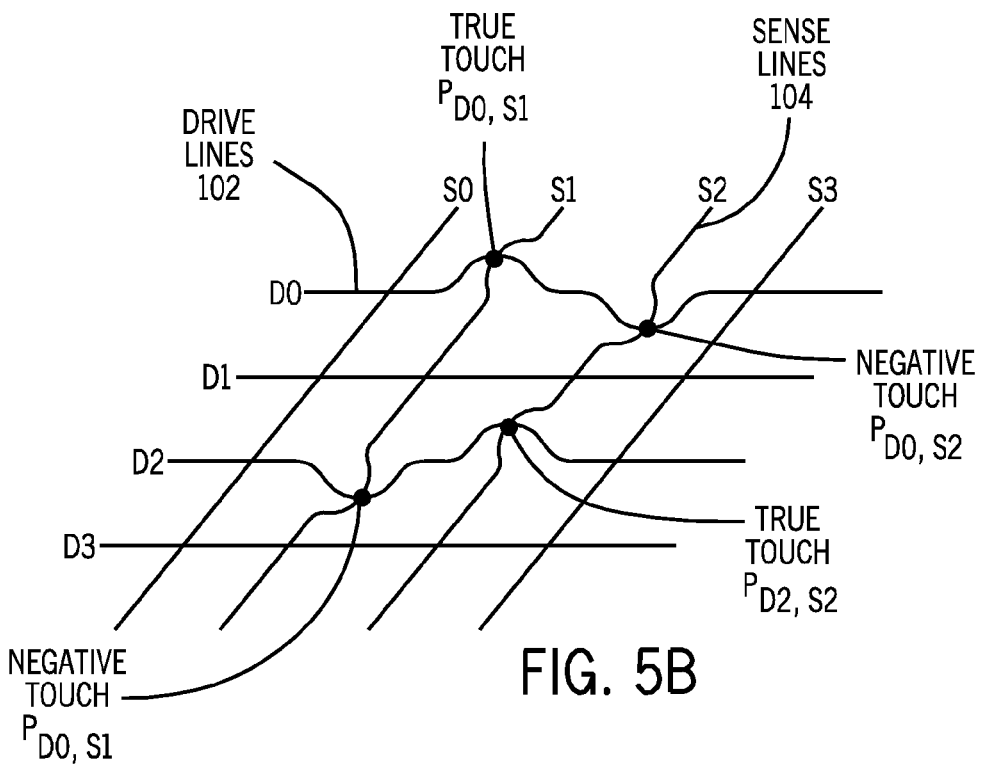
FIG. 5B illustrates an exemplary image map showing a three-dimensional view of the phenomenon of negative pixels corresponding to the simultaneous touch event illustrated in FIG. 5A.

FIGS. 5A-5B illustrate a simultaneous multiple touch event occurring on the touch sensor panel 100 in accordance with embodiments of the invention. Two fingers are touching two different spots on the touch sensor panel 100, at the pixel intersected by drive line D0 and sense line S1 ($P_{D0,S1}$) and at the pixel intersected by drive line D2 and sense line S2 ($P_{D2,S2}$). Under poor grounding conditions, there is parasitic capacitance at each of $P_{D0,S1}$ and $P_{D2,S2}$ as discussed above. In addition, negative pixels can be registered at the pixel (phantom location) intersected by drive line D0 and sense line S2 ($P_{D0,S2}$) and at the pixel (phantom location) intersected by drive line D2 and sense line S1 ($P_{D2,S1}$).

When drive line D0 is simulated, charge from $P_{D0,S1}$ is coupled on the finger touching over $P_{D0,S1}$. Instead of being shunted to ground, some charge is coupled back onto sense line S1 and also the user's other finger touching the touch sensor panel (e.g., onto sense line S2). If the user was properly grounded, the finger over $P_{D2,S2}$ would not cause charge to be coupled onto sense line S2 because drive line D2 would not be stimulated at the same time as drive line D0. The net effect is that with drive line D0 simulated, the sense amplifiers 110 senses a touch event at sense lines S1 and S2 (e.g., $P_{D0,S1}$ and $P_{DO,S2}$). Actual touch at $P_{D2,S2}$ similarly causes charge to be coupled to sense line S1 through the user's hand. Thus, when drive line D2 is stimulated, the sense amplifiers 110 senses a touch event at sense lines S1 and S2 (e.g., $P_{D2,S1}$ and $P_{D2,S2}$).

Unintended charge coupling back on sense lines S1 and S2 reduces the apparent touch detected at touch locations $P_{DO,S1}$ and $P_{D2,S2}$. The charge coupling across the user's fingers to other sense lines can also weaken adjacent pixels not being touched, to the point where output readings indicative of a negative amount of touch (a negative pixel) can be erroneously produced. Negative pixilation is made worse if there are multiple pixels being touched along the same drive line being stimulated, because then even more charge can be coupled onto other sense lines being simultaneously touched.

FIG. 5B illustrates an exemplary image map showing a three-dimensional view of the phenomenon of negative pixels corresponding to the simultaneous touch event illustrated in FIG. 5A. In FIG. 5B, positive output values are associated with locations of true touch (e.g., $P_{DO,S1}$ and $P_{D2,S2}$) and negative output values are associated with locations of negative touch (e.g., $P_{DO,S2}$ and $P_{D2,S1}$).

According to embodiments of the invention, parasitic capacitance correction can be performed for the touch sensor panel 100 by calculating an average ground capacitance, and then using the measured pixel touch output values and the average ground capacitance to estimate actual pixel touch output values. The estimated actual pixel touch output values are used to determine touch event(s) on the touch sensor panel 100.

Figure 6A:
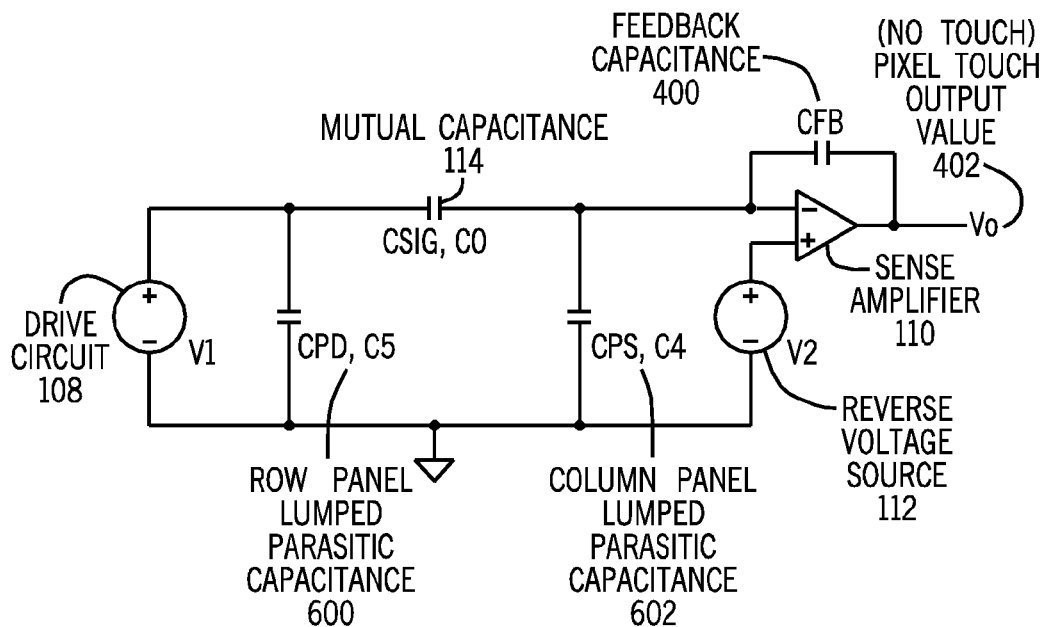
FIG. 6A illustrates a circuit diagram representative of a single pixel of the touch sensor panel showing a reverse voltage source and inherent capacitance in accordance with embodiments of the invention.

Prior to start of normal sensing operations of the touch sensor panel 100, the panel 100 (and the device including the panel 100) undergoes calibration, baseline measurements, and parameter setup. In particular, in order to perform parasitic capacitance correction in accordance with embodiments of the invention, an average panel lumped parasitic capacitance for the column (e.g., the sense line) is determined during calibration. A circuit diagram representative of any single pixel 106 of the touch sensor panel 100 is illustrated in FIG. 6A, showing capacitance inherent to the touch sensor panel 100 including a panel lumped parasitic capacitance 600 for the row ($C_{PD}$) and a panel lumped parasitic capacitance 602 for the column ($C_{PS}$). Panel lumped parasitic capacitance 600 for the row ($C_{PD}$) comprises the parasitic capacitance of the drive line within the touch sensor panel to the local ground. Panel lumped parasitic capacitance 602 for the column ($C_{PS}$) comprises the parasitic capacitance of the sense line within the touch sensor panel to the local ground. Touch and drive capacitance 406 ($C_{FD}$) comprises the parasitic capacitance of the drive line through the touch sensor panel to the touch object (for example, the user's finger). Touch and sense capacitance 408 ($C_{FS}$) comprises the parasitic capacitance of the sense line through the touch sensor panel to the touch object (for example, the user's finger).

Figure 7:
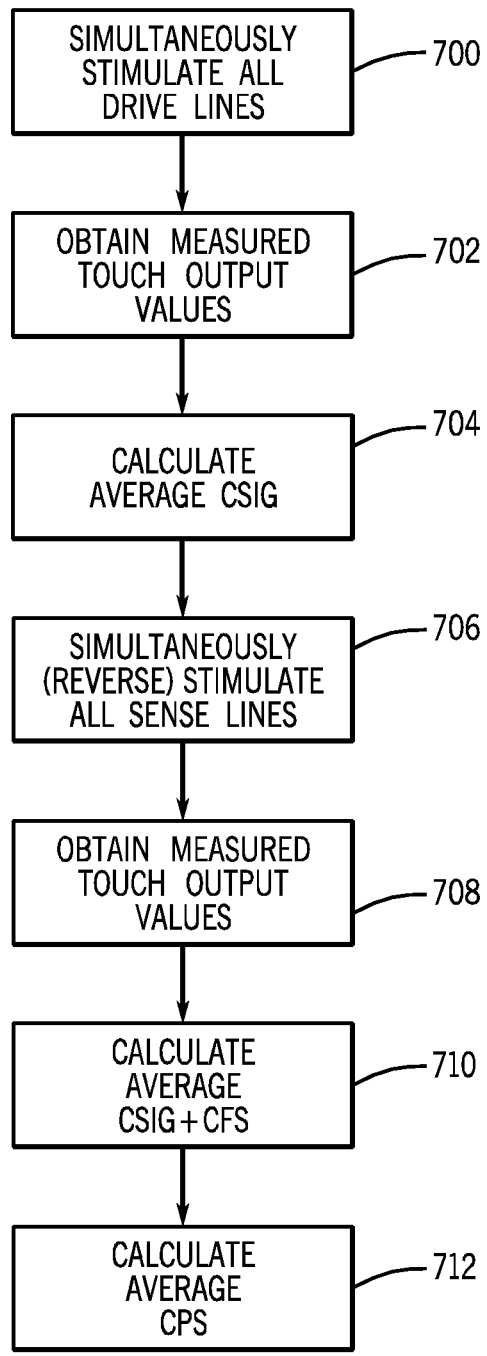
FIG. 7 illustrates a flow diagram for determining an average panel lumped parasitic capacitance for the column in accordance with embodiments of the invention.

FIG. 7 illustrates a flow diagram for determining the average panel lumped parasitic capacitance for the column (average $C_{PS}$) during calibration of the touch sensor panel 100. At a block 700, all of the drive lines 102 are simultaneously stimulated with $V_1$ (such as a sine wave voltage) by the drive circuits 108 while the reverse voltage sources 112 are held at zero value. In response, at a block 702, pixel touch output values are sensed at the sense amplifiers 110 for all the sense lines 104. Since there is no touching of the touch sensor panel 100, the pixel touch output value at each of the sense amplifiers 110 comprises the (no touch) pixel touch output value 402 ($V_o$). At a block 704, an average value of the mutual capacitance 114 for each of the pixels 106 can be calculated as follows:

$$\text{average } C_{SIG} = \text{average}[C_{FB} \times (V_o/V_1)] \qquad (5)$$

Next at a block 706, all of the sense lines 104 are simultaneously stimulated with $V_2$ (such as a sine wave voltage) by the reverse voltage sources 112 while the drive circuits 108 are held at zero value. The reverse voltage sources 112 reversely drive the sense lines 104 (the drive circuits 102 forwardly driving the drive lines 102 at the block 700). In response, at a block 708, pixel touch output values are sensed at the sense amplifiers 110 for all the sense lines 104. Since there is no touch occurring, the pixel touch output value at each of the sense amplifiers 110 again comprises the (no touch) pixel touch output value 402 ($V_o$). Correspondingly, the average sum of $C_{SIG}$ and $C_{PS}$ capacitance at each of the pixels 106 can be calculated as follows (block 710):

$$\text{average}[C_{SIG} + C_{PS}] = \text{average}[C_{FB} \times (V_o/V_2)] \qquad (6)$$

Lastly at a block 712, the average $C_{PS}$ can be determined and expressed as follows:

$$\text{average } C_{PS} = \text{average}[C_{SIG} + C_{PS}] - \text{average } C_{SIG} \qquad (7)$$

In alternative embodiments, blocks 706-710 may occur before blocks 700-704. The average panel lumped parasitic capacitance for the column (average $C_{PS}$) may be determined once for the touch sensor panel 100 and need not be recalculated during normal sensing operations.

Once the average panel lumped parasitic capacitance for the column (average $C_{PS}$) is known, it is used to determine the average ground capacitance. (The term "average ground capacitance" may be used interchangeably with "ground capacitance" or $C_{GND}$ herein.) The ground capacitance 410 ($C_{GND}$) comprises a touch body to earth ground capacitance in series with an earth ground to local device chassis ground of the sense amplifiers 110. Since the ground capacitance 410 changes depending on how well the user or object touching the touch sensor panel 100 is also touching the device chassis, the ground capacitance 410 may be dynamic during normal use of the touch sensor panel 100. In order to correctly track the level of grounding of the user (and correspondingly determine accurate actual touch output values), the ground capacitance 410 can be periodically (or based on other timing sequence) determined during normal operation of the device.

Figure 6B:
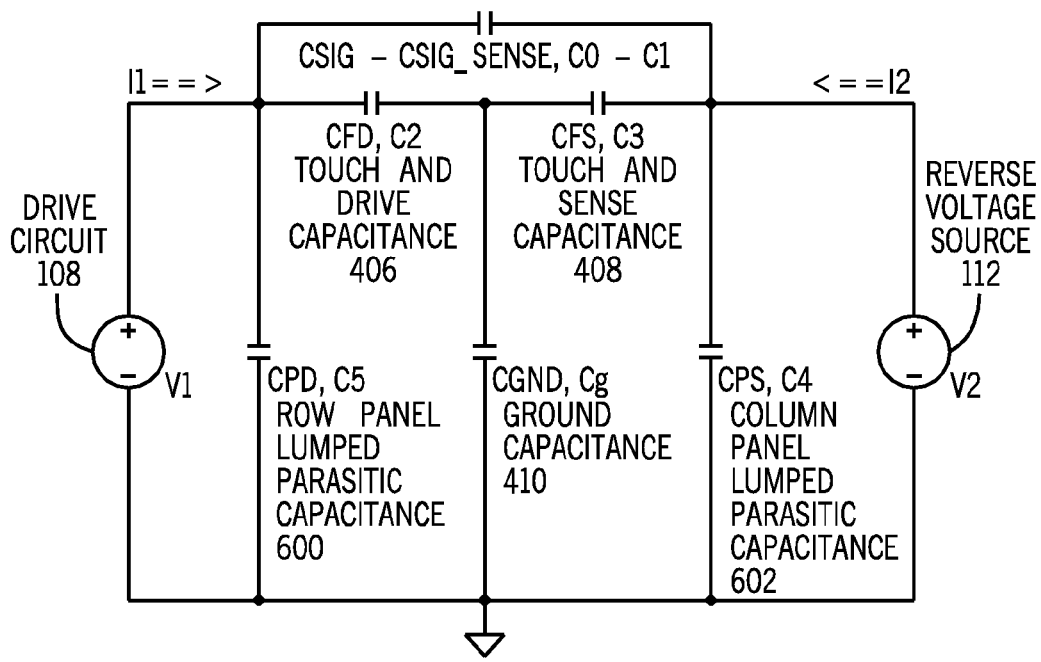
FIG. 6B illustrates a circuit diagram representative of a single pixel during normal operation in accordance with embodiments of the invention.
Figure 8:
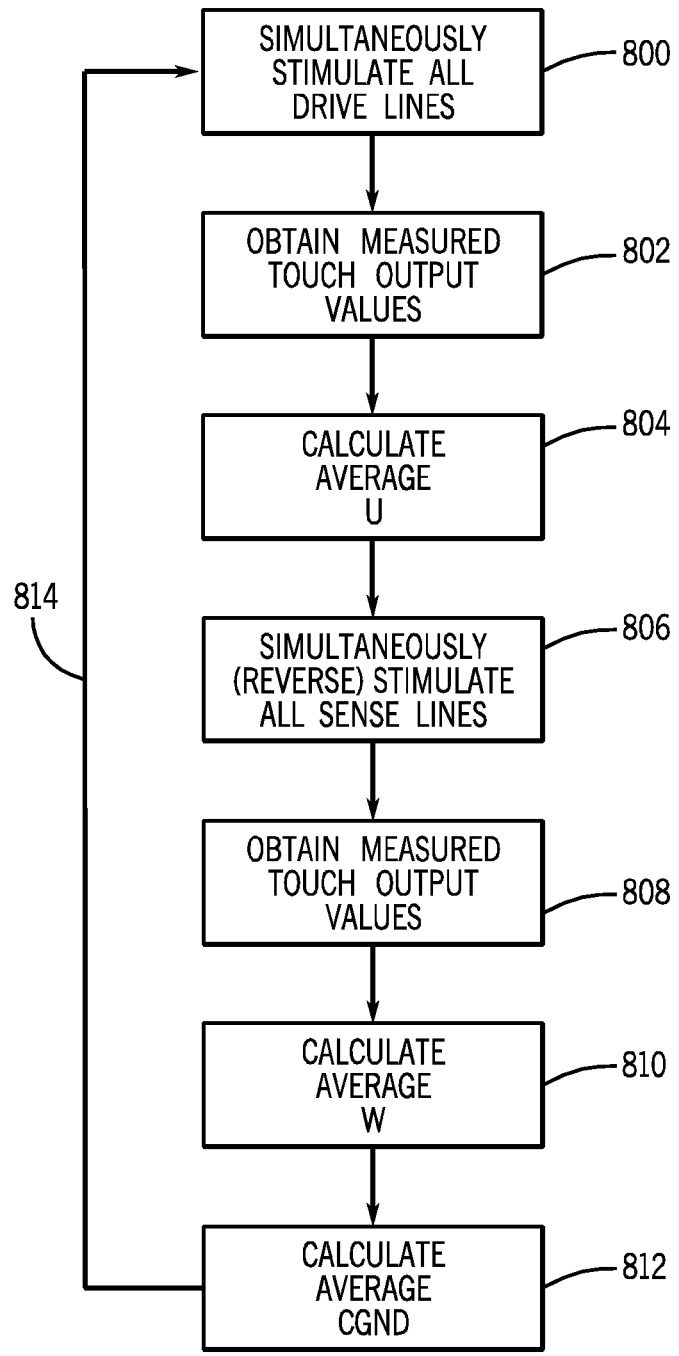
FIG. 8 illustrates a flow diagram for determining the average ground capacitance during normal operation in accordance with embodiments of the invention.

Calculation of the average ground capacitance will be described with reference to FIGS. 6B and 8. FIG. 6B illustrates a circuit diagram representative of a single pixel 106 during normal operations, in which a touch event may be occurring on the pixel 106. (Note that FIGS. 6A-6B include dual symbols for the various capacitances to facilitate ease of discussion and legibility in the equations provided below.) FIG. 8 illustrates a flow diagram for determining the average ground capacitance during normal operation of the device.

At a block 800, all of the drive lines 102 are simultaneously stimulated with $V_1$ (such as a sine wave voltage) by the drive circuits 108 while the reverse voltage sources 112 are held at zero value. In response, at a block 802, pixel touch output values $V_o$ are sensed at the sense amplifiers 110 for all the sense lines 104. At a block 804, a value U is calculated for each pixel using the sensed pixel touch output value $V_o$ for that location:

$$U = -C_{FB} \times (V_o/V_1) \qquad (8)$$

Then an average U is obtained by averaging all of the calculated U values from all pixel locations.

At a block 806, all of the sense lines 104 are simultaneously stimulated with $V_2$ (such as a sine wave voltage) by the reverse voltage sources 112 while the drive circuits 108 are held at zero value. In response, at a block 808, pixel touch output values $V_o$ are sensed at the sense amplifiers 110 for all the sense lines 104. At a block 810, a value W is calculated for each pixel using the sensed pixel touch output value $V_o$ for that location and the average $C_{PS}$ discussed above:

$$W = -[C_{FB} \times (V_o/V_2)] - \text{average } C_{PS} \qquad (9)$$

Then an average W is obtained by averaging all of the calculated W values from all pixel locations.

The calculated average U and average W values are used to calculate an average ground capacitance at a block 812. The average ground capacitance is a value global to all pixel locations for the touch sensor panel 100 until the next ground capacitance value is calculated. The average ground capacitance (average $C_{GND}$) can be obtained using the following equation:

$$\text{average } C_{GND} = \frac{(\text{average } W - \text{average } U)(A_2 + A_3)}{(A_3)(\text{average } C_{SIG\_SENSE}) +} \qquad (10)$$
$$\text{average } U - \text{average } W$$

where $$\text{average } C_{SIG\_SENSE} = \frac{\text{average } W + \frac{(A_3)(\text{average } U)}{A_2} - \left(1 + \frac{A_3}{A_2}\right)(\text{average } C_{SIG})}{A_3 - \left(1 + \frac{A_3}{A_2}\right)},$$

$$C_{FD} = C_2 \approx A_2 \times C_{SIG\_SENSE}, \text{ and}$$

$$C_{FS} = C_3 \approx A_3 \times C_{SIG\_SENSE}.$$

$A_2$ and $A_3$ are approximate constants for each touch sensor panel 100 or for a particular touch sensor panel design. These constants may be obtained through simulation and/or empirical measurements for a given panel sensing pattern design; measured, for example, during efforts to design the touch sensor panel.

After the average $C_{GND}$ has been determined, the device returns to the block 800 (branch 814) to calculate the next average $C_{GND}$. There may be a pre-set time delay between successive $C_{GND}$ calculations.

In alternative embodiments, blocks 806-810 may occur before blocks 800-804.

Figure 9:
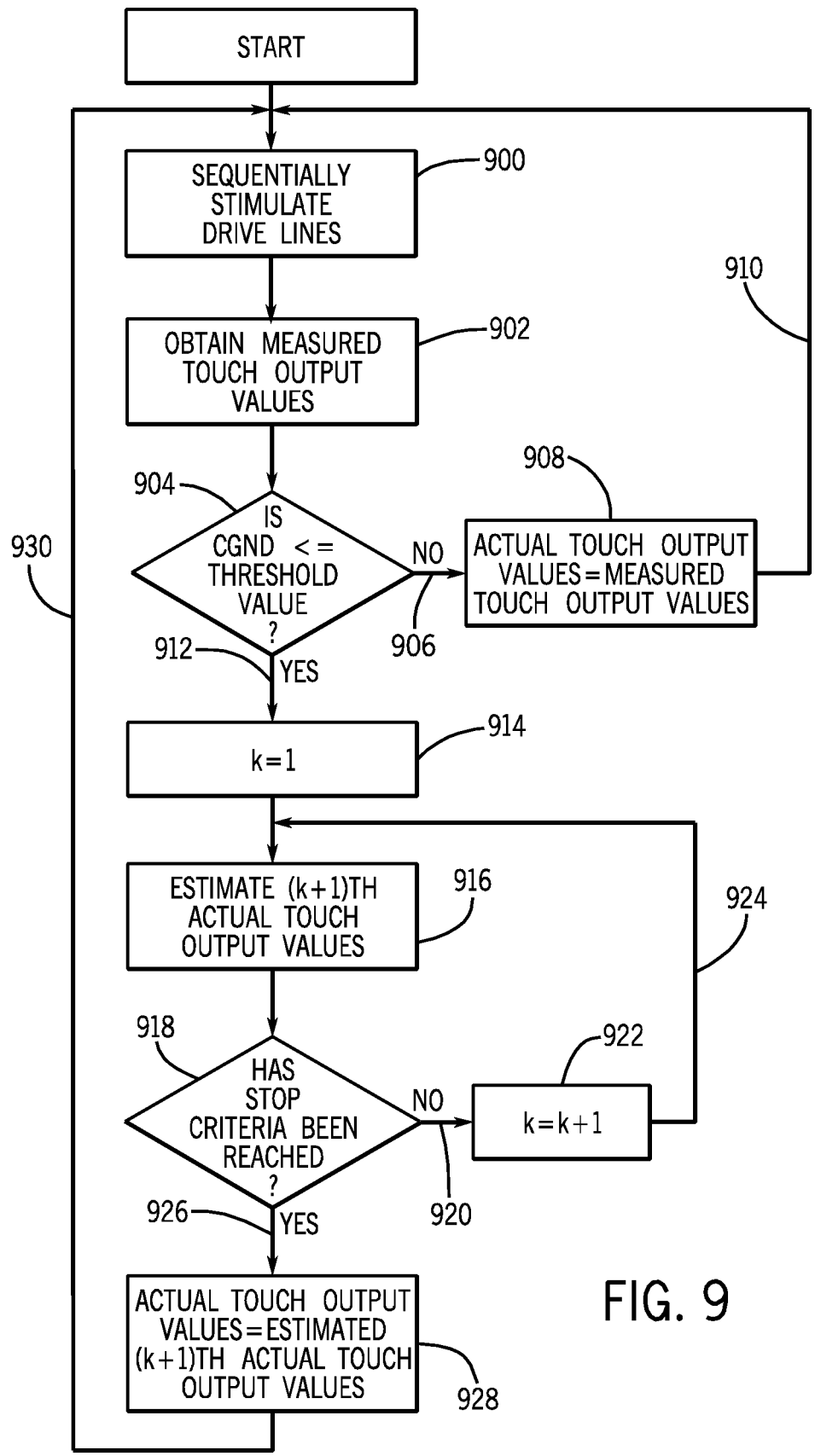
FIG. 9 illustrates a flow diagram for correcting parasitic capacitance effects during normal operation of the device in accordance with embodiments of the invention.

FIG. 9 illustrates a flow diagram for correcting parasitic capacitance effects during normal operation of the device in accordance with embodiments of the invention. At a block 900, the drive lines 102 are sequentially stimulated to sense touch event(s) on the touch sensor panel 100. In response to the stimulation signals to the drive lines 102, measured pixel touch output values are obtained from the sense lines 104 at a block 902. Next a check is performed to see if the average ground capacitance obtained in accordance with FIG. 8 is equal to or less than a predetermined threshold value (block 904). Examples of predetermined threshold values may be 60 pF, 80 pF, or greater.

If the average ground capacitance is above the threshold value (no branch 906), then the actual touch output values may be considered to be the same as the measured touch output values. Correction for parasitic capacitance is not required and the system may be readied to again sense touch event(s) (branch 910). Otherwise, if the average ground capacitance is at or below the threshold value (yes branch 912), then the user is poorly grounded to the device and the measured touch output values include artifacts caused by parasitic capacitance.

At a block 914, a counter is initiated for the iterative estimation of the actual touch output values (the counter is set to k=1). Next, an (k+1)th set of actual touch output values are estimated at a block 916. The actual and measured touch output values are discussed below with reference to capacitance values. Nevertheless, it is understood that the touch output values can be voltage values, which are proportional to its respective capacitances.

The relationship between the measured and actual touch output values can be expressed as:

$$\text{CSIG\_SENSE}_{m,j\ measured} = \text{CSIG\_SENSE}_{m,j\ actual} - \text{CNEG}_{m,j} \qquad (11)$$

For the case where it can be assumed that little interaction occurs to adjacent drive and sense lines, $\text{CNEG}_{m,j}$ in Equation (11) can be approximated as:

$$CNEG_{m,j} = A \frac{\sum_{\substack{all\ touched \\ Sense\ n}} \text{CSIG\_SENSE}_{m,n} \times \sum_{\substack{all\ touched \\ Drive\ j}} \text{CSIG\_SENSE}_{i,j}}{\sum_{\substack{all\ touched \\ Pixels\ (r,s)}} \text{CSIG\_SENSE}_{r,s} + C_G} \qquad (12)$$

where $A = (A_2 \times A_3)/(A_2 + A_3)$ and
$C_G = CGND/(A_2 + A_3)$.

Rewriting Equations (11) and (12) into matrix form, Equation (13) is a form of generalized Sylvester equation where closed form solutions are known only for a special case where C is symmetric (e.g., $C = C^T$):

$$C' = C\ A \frac{CQC}{v^T C u + C_G} \qquad (13)$$

where $C' = \begin{bmatrix} \cdots & \cdots & \cdots \\ \cdots & \text{CSIG\_SENSE}_{m,j measured} & \cdots \\ \cdots & \cdots & \cdots \end{bmatrix}$, $$C = \begin{bmatrix} \cdots & \cdots & \cdots \\ \cdots & \text{CSIG\_SENSE}_{m,j actual} & \cdots \\ \cdots & \cdots & \cdots \end{bmatrix},$$

$$Q = \begin{bmatrix} 1 & \cdots & 1 \\ \vdots & 1 & \vdots \\ 1 & \cdots & 1 \end{bmatrix},$$

$$u = \begin{bmatrix} 1 \\ \vdots \\ 1 \end{bmatrix}, \text{ and}$$

$$v = \begin{bmatrix} 1 \\ \vdots \\ 1 \end{bmatrix}.$$

Since C is unlikely to be symmetric for an arbitrary touch profile, exact solution to Equation (13) is not possible. However, an iterative approach can be used to approximate or estimate C:

$$\text{matrix of CSIG\_SENSE}_{actual} = C_{k+1} = C' + A\frac{C_k Q C_k}{v^T C_k u + C_G} \quad (14)$$

where $k = 1, 2, 3, \ldots$ and $C_k = C'$ for $k = 1$

If the calculated (k+1)th set of actual touch output values are within a preset convergence percentage of the kth actual touch output values (block 918), then the measured touch output values are replaced with the (k+1)th estimated actual pixel touch output values in a block 928 (yes branch 926). Negative pixel compensation is complete for the current set of measured pixel touch output values, and the panel processor is ready to correct the next set of measured output values (return branch 930 to block 900). In alternative embodiments, return branch 930 may be to block 904 if the next set of measured output values have already been obtained while correction of the current set of output values are in progress.

The stop criterion for determining convergence can be expressed as follows:

$$\|C_{k+1} - C_k\|_2 < a\|C_k - C_{k-1}\|_2 \text{ where } a << 1 \quad (15)$$

Figure 10:
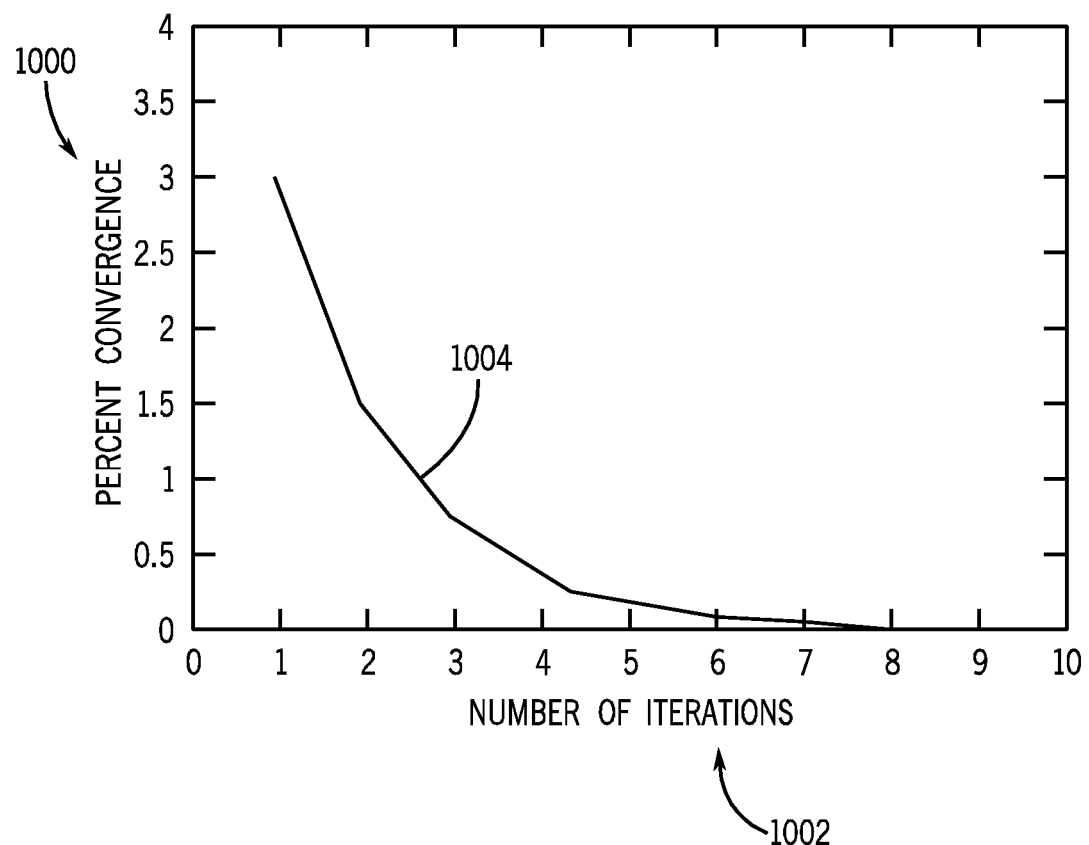
FIG. 10 illustrates a convergence plot relative to the number of iterations of the actual pixel touch output values estimation in accordance with embodiments of the invention.

Otherwise if convergence has not occurred (no branch 920), then the counter is incremented by one (k=k+1) in a block 922, and the next iteration of the (k+1)th actual pixel touch output values are estimated (return branch 924 to block 916). Successive iterations can occur until the stop criterion is satisfied at block 918. As illustrated by a plot line 1004 in FIG. 10, almost complete convergence can occur within less than ten iterations. The vertical axis 1000 represents the percentage of convergence and the horizontal axis 1002 represents the number of iterations of actual touch output value calculations.

Depending on processor capability, the rate at which touch event(s) are sensed, and/or touch image quality requirements, the degree of required convergence can be specified to meet system requirements.

Figure 11:
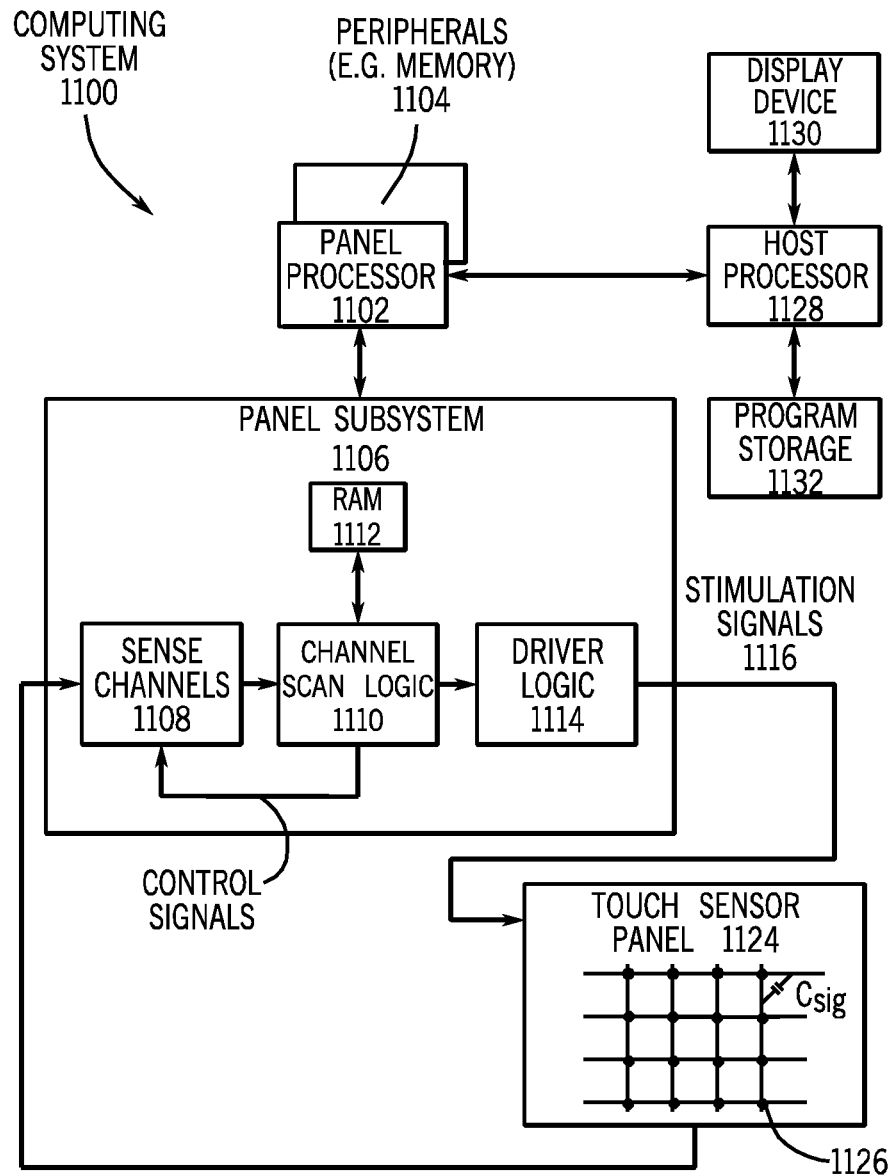
FIG. 11 illustrates an exemplary computing system that can include one or more of the embodiments of the invention.

FIG. 11 illustrates exemplary computing system 1100 that can include one or more of the embodiments of the invention described above. Computing system 1100 can include one or more panel processors 1102 and peripherals 1104, and panel subsystem 1106. Peripherals 1104 can include, but are not limited to, random access memory (RAM) or other types of memory or storage, watchdog timers and the like. Panel subsystem 1106 can include, but is not limited to, one or more sense channels 1108, channel scan logic 1110 and driver logic 1114. Channel scan logic 1110 can access RAM 1112, autonomously read data from the sense channels and provide control for the sense channels. In addition, channel scan logic 1110 can control driver logic 1114 to generate stimulation signals 1116 at various frequencies and phases that can be selectively applied to drive lines of touch sensor panel 1124. Channel scan logic 1110 can also control driver logic 1114 to generate reverse stimulation signals at various frequencies and phases that can be selectively applied to sense lines of the touch sensor panel 1124. Alternatively, separate channel scan logic and/or separate control drive logic may be provided within the panel subsystem 1106 to provided desired stimulation signals to the sense lines. In some embodiments, panel subsystem 1106, panel processor 1102 and peripherals 1104 can be integrated into a single application specific integrated circuit (ASIC).

Touch sensor panel 1124 can include a capacitive sensing medium having a plurality of drive lines and a plurality of sense lines, although other sensing media can also be used. Either or both of the drive and sense lines can be coupled to improved reliability conductive traces according to embodiments of the invention. Each intersection of drive and sense lines can represent a capacitive sensing node and can be viewed as picture element (pixel) 1126, which can be particularly useful when touch sensor panel 1124 is viewed as capturing an "image" of touch. (In other words, after panel subsystem 1106 has determined whether a touch event has been detected at each touch sensor in the touch sensor panel and panel processor 1102 has performed negative pixel compensation, the pattern of touch sensors in the multi-touch panel at which a touch event occurred can be viewed as an "image" of touch (e.g. a pattern of fingers touching the panel).) Each sense line of touch sensor panel 1124 can drive sense channel 1108 (also referred to herein as an event detection and demodulation circuit) in panel subsystem 1106.

Computing system 1100 can also include host processor 1128 for receiving outputs from panel processor 1102 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1128 can also perform additional functions that may not be related to panel processing, and can be coupled to program storage 1132 and display device 1130 such as an LCD display for providing a UI to a user of the device. Display device 1130 together with touch sensor panel 1124, when located partially or entirely under the touch sensor panel, can form a touch screen.

Note that one or more of the functions described above can be performed by firmware stored in memory (e.g. one of the peripherals 1104 in FIG. 11) and executed by panel processor 1102, or stored in program storage 1132 and executed by host processor 1128. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 12A:
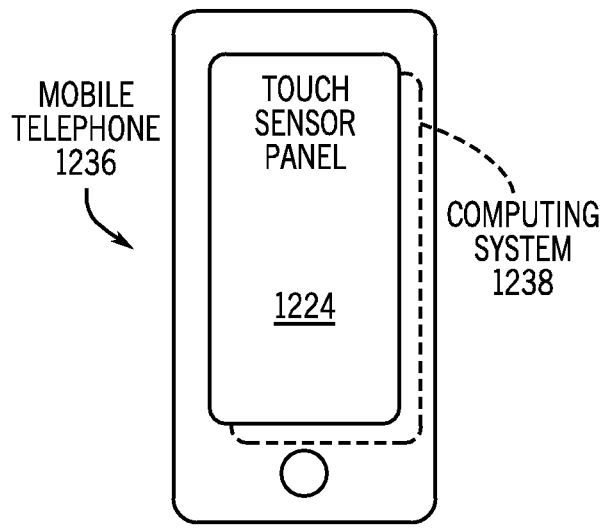
FIG. 12A illustrates exemplary mobile telephone that can include the computing system shown in FIG. 11 in accordance with embodiments of the invention.

FIG. 12A illustrates exemplary mobile telephone 1236 that can include computing system 1238 similar to computing system 1100. Mobile telephone 1236 can include touch sensor panel 1224 and associated processing capabilities (such as panel processor 1102 and panel subsystem 1106) in order to dynamically and selectively provide negative pixel compensation according to embodiments of the invention.

Figure 12B:
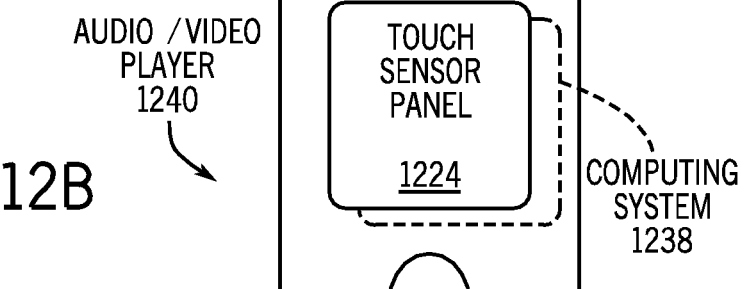
FIG. 12B illustrates exemplary digital media player that can include the computing system shown in FIG. 11 in accordance with embodiments of the invention.

FIG. 12B illustrates exemplary audio/video player 1240 (or a digital media player) that can include computing system 1238 similar to computing system 1100. Audio/video player 1240 can include touch sensor panel 1224 and associated processing capabilities (such as panel processor 1102 and panel subsystem 1106) in order to dynamically and selectively provide negative pixel compensation according to embodiments of the invention.

Figure 12C:
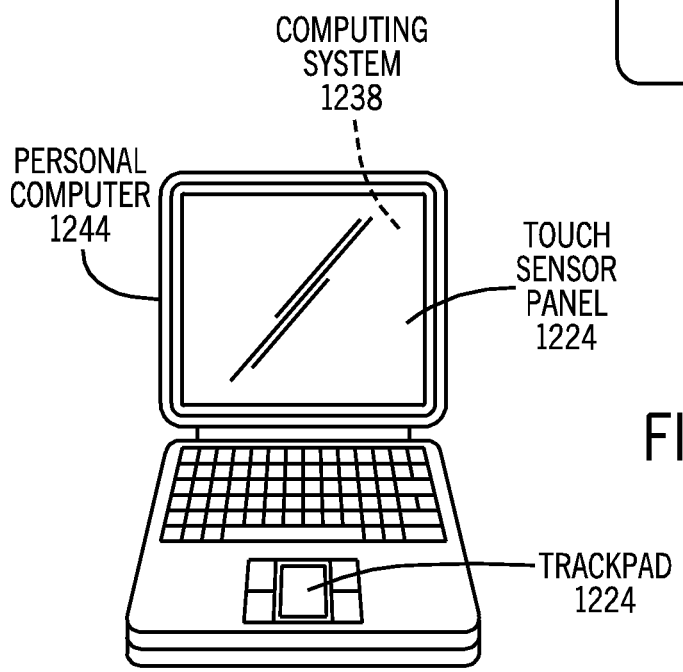
FIG. 12C illustrates exemplary personal computer that can include the computing system shown in FIG. 11 in accordance with embodiments of the invention.

FIG. 12C illustrates exemplary computer 1244 that can include computing system 1238 similar to computing system 1100. Computer 1244 can include touch sensor panel 1224 (included in a display and/or a trackpad) and associated processing capabilities (such as panel processor 1102 and panel subsystem 1106) in order to dynamically and selectively provide negative pixel compensation according to embodiments of the invention. The touch sensor panel 1224 may comprise, but is not limited to, at least one of a touch screen, a trackpad, and any other touch input surface device.

The mobile telephone, media player, and computer of FIGS. 12A-12C can achieve improved accuracy in detection of touch event(s) by utilizing the parasitic capacitance compensation scheme according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for compensating for negative pixel effects on a touch sensor panel, comprising:
   estimating an object-to-ground capacitance of an object in contact with the touch sensor panel, wherein the estimation is made by simultaneously stimulating a plurality of drive lines to obtain a first measurement and simultaneously stimulating a plurality of sense lines to obtain a second measurement; and
   determining an effective pixel touch output value for each pixel of the touch sensor panel based on the estimated object-to-ground capacitance and measured pixel touch output values when the estimated object-to-ground capacitance is at or below a predetermined threshold.

2. The method of claim 1, wherein estimating the object-to-ground capacitance comprises periodically estimating the object-to-ground capacitance during normal sensing operation of the touch sensor panel.

3. The method of claim 1, further comprising calculating a successive actual pixel touch output value for each pixel of the touch sensor panel utilizing the object-to-ground capacitance and the actual pixel touch output value for each pixel.

4. The method of claim 3, wherein the successive actual pixel touch output value for each pixel is more accurate than the actual pixel touch output value for each pixel.

5. The method of claim 1, wherein the touch sensor panel is incorporated within a computing system.

6. An apparatus for compensating for negative pixel effects on a touch sensor panel, comprising:
   a first stimulation signal source coupled to each of a plurality of drive lines having a first orientation on the touch sensor panel, the first stimulation signal sources configured for being activated to generate first measured pixel touch output values;
   a sense amplifier coupled to each of a plurality of sense lines having a second orientation different from the first orientation on the touch sensor panel, the sense amplifier including a second stimulation signal source coupled to an input of the sense amplifier, the second stimulation signal sources configured for being activated to generate second measured pixel touch output values; and
   a panel processor configured for calculating object-to-ground capacitance using the first and second measured pixel touch output values and determining effective pixel touch output values from use of the first measured pixel touch output values and an estimated object-to-ground capacitance when the object-to-ground capacitance is at or below a predetermined threshold.

7. The apparatus of claim 6, wherein the first stimulation signal sources are configured for being simultaneously activated to generate the first measured pixel touch output values.

8. The apparatus of claim 6, wherein the second stimulation signal sources are configured for being simultaneously activated to generate the second measured pixel touch output values.

9. The apparatus of claim 6, wherein the panel processor is configured for estimating the object-to-ground capacitance of an object in contact with the touch sensor panel utilizing the first measured pixel touch output values, second measured pixel touch output values, an average mutual capacitance, and a feedback capacitance of the sense amplifiers.

10. The apparatus of claim 9, wherein the panel processor is configured to estimate the object-to-ground capacitance periodically during normal operation of the touch sensor panel.

11. The apparatus of claim 6, wherein the second stimulation signal sources provide a reverse stimulation signal to the sense lines.

12. The apparatus of claim 6, wherein the touch sensor panel is incorporated in a computing system.

13. A system for compensating for negative pixel effects on a touch sensor panel, comprising:
   a touch sensor panel having a plurality of drive lines and a plurality of sense lines;
   a panel subsystem coupled to the touch sensor panel, the panel subsystem including
      driver logic coupled to the drive lines of the touch sensor panel, the driver logic configured for generating first stimulation signals, and
      sense channels coupled to the sense lines of the touch sensor panel, each sense channel including a sense amplifier having a second stimulation signal source coupled to an input of the sense amplifier, the sense channels configured for generating first measured pixel touch output values in response to the first stimulation signals from the driver logic and generating second measured pixel touch output values in response to second stimulation signals from the second stimulation signal sources; and a panel processor coupled to the panel subsystem and configured for estimating an object-to-ground capacitance of an object in contact with the touch sensor panel wherein the estimation is made by simultaneously stimulating the drive lines to obtain a first measurement and simultaneously stimulating the sense lines to obtain a second measurement; and the panel processor further configured to determine an effective pixel touch output value for each pixel of the touch sensor panel based on the the estimated object-to-ground capacitance and measured pixel touch values when the estimated object-to-ground capacitance is below a predetermined threshold.

14. The system of claim 13, wherein the driver logic is configured to simultaneously provide the first stimulation signals to the plurality of drive lines.

15. The system of claim 13, wherein the panel processor is configured for calculating a first precursor value to the object-to-ground capacitance utilizing the first stimulation signals, first measured pixel touch output values, and a feedback capacitance of the sense amplifiers.

16. The system of claim 13, wherein second stimulation signal source are configured to simultaneously provide the second stimulation signals to the plurality of sense lines.

17. The system of claim 13, wherein the panel processor is configured for calculating a second precursor value to the object-to-ground capacitance utilizing the second stimulation signals, second measured pixel touch output values, and a feedback capacitance of the sense amplifiers.

18. The system of claim 17, wherein the second precursor value further utilizes a panel lumped parasitic capacitance for the sense lines.

19. The system of claim 18, wherein the panel processor is configured for calculating the panel lumped parasitic capacitance for the sense lines during calibration of the touch sensor panel.

20. The system of claim 18, wherein the panel processor is configured for calculating the panel lumped parasitic capacitance for the sense lines utilizing the first stimulation signals, first measured pixel touch output values, second simulation signals, second measured pixel touch output values, and the feedback capacitance.

21. The system of claim 13, wherein the panel processor is configured for determining effective pixel touch output values from iterative use of the first measured pixel touch output values and the object-to-ground capacitance.

22. A non-transitory computer-readable medium comprising program code for compensating for negative pixel effects on a touch sensor panel, the program code for causing performance of a method comprising:

periodically estimating an existence of a poor grounding condition of an object in contact with the touch sensor panel by estimating an object-to-ground capacitance of an object in contact with the touch sensor panel, wherein the estimation is made by simultaneously stimulating a plurality of drive lines to obtain a first measurement and simultaneously stimulating a plurality of sense lines to obtain a second measurement; and if the poor grounding condition exists, iteratively calculating an effective reduction in charge coupling of the object in contact with the touch sensor panel for each pixel using detected reduction in charge coupling for each pixel from sense amplifiers coupled to sense lines and an estimated ground capacitance indicative of the poor grounding condition.

23. The non-transitory computer-readable medium of claim 22, the program code further for providing an actual pixel touch output value for each pixel utilizing the calculated actual reduction in charge coupling for each pixel and a mutual capacitance of each pixel prior to the object being in contact with the touch sensor panel.

24. The non-transitory computer-readable medium of claim 22, the program code further for providing that after first iteration of calculated actual reduction in charge coupling for each pixel, the immediately previous calculated actual reduction in charge coupling and the ground capacitance are used to calculate subsequent iterations of the actual reduction in charge coupling for each pixel.

25. The non-transitory computer-readable medium of claim 22, the program code further for determining convergence of the calculated actual reduction in charge coupling to an immediately preceding calculated actual reduction in charge coupling.

26. The non-transitory computer-readable medium of claim 22, wherein the touch sensor panel and the computer-readable medium are incorporated in a computing system.

27. A mobile telephone including a touch sensor panel and configured to provide negative pixel compensation to the touch sensor panel, comprising:

a first stimulation signal source coupled to each of a plurality of drive lines having a first orientation on the touch sensor panel, the first stimulation signal sources configured for being activated to generate first measured pixel touch output values;

a sense amplifier coupled to each of a plurality of sense lines having a second orientation different from the first orientation on the touch sensor panel, the sense amplifier including a second stimulation signal source coupled to an input of the sense amplifier, the second stimulation signal sources configured for being activated to generate second measured pixel touch output values; and a panel processor configured for estimating an object-to-ground capacitance of an object in contact with the touch sensor panel wherein the estimation is made by simultaneously stimulating the drive lines to obtain a first measurement and simultaneously stimulating the sense lines to obtain a second measurement; and the panel processor further configured for determining effective pixel touch output values from iterative use of the first measured pixel touch output values and the estimated object-to-ground capacitance when the estimated object-to-ground capacitance is below a predetermined threshold.

28. A media player including a touch sensor panel and configured to provide negative pixel compensation to a touch sensor panel, comprising:

the touch sensor panel having a plurality of drive lines and a plurality of sense lines;

a panel subsystem coupled to the touch sensor panel, the panel subsystem including driver logic coupled to the drive lines of the touch sensor panel, the driver logic configured for generating first stimulation signals, and sense channels coupled to the sense lines of the touch sensor panel, each sense channel including a sense amplifier having a second stimulation signal source coupled to an input of the sense amplifier, the sense channels configured for generating first measured pixel touch output values in response to the first stimulation signals from the driver logic and generating second measured pixel touch output values in response to second stimulation signals from the second stimulation signal sources; and a panel processor coupled to the panel subsystem and configured for estimating an object-to-ground capacitance of an object in contact with the touch sensor panel wherein the estimation is made by simultaneously stimulating the drive lines to obtain a first measurement and simultaneously stimulating the sense lines to obtain a second measurement; and the panel processor further configured to determine an effective pixel touch output value for each pixel of the touch sensor panel based on the the estimated object-to-ground capacitance and measured pixel touch values when the estimated object-to-ground capacitance is below a predetermined threshold.

29. A computing system including a touch sensor panel and configured to provide negative pixel compensation to the touch sensor panel, comprising:

a first stimulation signal source coupled to each of a plurality of drive lines having a first orientation on the touch sensor panel, the first stimulation signal sources configured for being activated to generate first measured pixel touch output values;

a sense amplifier coupled to each of a plurality of sense lines having a second orientation different from the first orientation on the touch sensor panel, the sense amplifier including a second stimulation signal source coupled to an input of the sense amplifier, the second stimulation signal sources configured for being activated to generate second measured pixel touch output values; and a panel processor configured for estimating an object-to-ground capacitance of an object in contact with the touch sensor panel wherein the estimation is made by simultaneously stimulating the drive lines to obtain a first measurement and simultaneously stimulating the sense lines to obtain a second measurement; and the panel processor further configured for determining effective pixel touch output values from iterative use of the first measured pixel touch output values and the estimated object-to-ground capacitance when the estimated object-to-ground capacitance is below a predetermined threshold.

30. The computing system of claim 29, wherein the touch sensor panel comprises at least one of a trackpad, a touch screen, and a touch input surface device.

* * * * *